US012570535B2

(12) United States Patent
Kim et al.

(10) Patent No.: US 12,570,535 B2
(45) Date of Patent: Mar. 10, 2026

(54) METHOD OF MANUFACTURING SILICA AEROGEL

(71) Applicant: LG CHEM, LTD., Seoul (KR)

(72) Inventors: Young Hun Kim, Daejeon (KR); Tae Gyeong Kang, Daejeon (KR); Joon Ho Shin, Daejeon (KR); Se Won Baek, Daejeon (KR); Kyoung Shil Oh, Daejeon (KR); Sang Woo Park, Daejeon (KR); Sung Jin Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 348 days.

(21) Appl. No.: 18/016,527

(22) PCT Filed: Jul. 23, 2021

(86) PCT No.: PCT/KR2021/009533
§ 371 (c)(1),
(2) Date: Jan. 17, 2023

(87) PCT Pub. No.: WO2022/019697
PCT Pub. Date: Jan. 27, 2022

(65) Prior Publication Data
US 2023/0286811 A1 Sep. 14, 2023

(30) Foreign Application Priority Data

Jul. 24, 2020 (KR) ........................ 10-2020-0092415

(51) Int. Cl.
*C01B 33/158* (2006.01)
*C01B 33/152* (2006.01)

(52) U.S. Cl.
CPC ........ *C01B 33/1585* (2013.01); *C01B 33/152* (2013.01)

(58) Field of Classification Search
CPC . C01B 33/1585; C01B 33/152; C01B 33/158; C01B 33/159; C13B 30/12
See application file for complete search history.

(56) References Cited

U.S. PATENT DOCUMENTS

| | | | | |
|---|---|---|---|---|
| 7,618,608 | B1* | 11/2009 | Keller, Sr. | ........... C01B 33/1585 |
| | | | | 423/338 |
| 2005/0192366 | A1* | 9/2005 | Ou | ........................ C01B 33/1585 |
| | | | | 521/64 |

(Continued)

FOREIGN PATENT DOCUMENTS

| | | |
|---|---|---|
| CN | 109020470 A | 12/2018 |
| CN | 109574622 A | 4/2019 |

(Continued)

OTHER PUBLICATIONS

Machine translation of KR-1913507-B1 (Year: 2018).*

(Continued)

*Primary Examiner* — Sally A Merkling
*Assistant Examiner* — Logan Laclair
(74) *Attorney, Agent, or Firm* — Bryan Cave Leighton Paisner LLP

(57) ABSTRACT

Provided is a method of manufacturing a silica aerogel, which includes: (1) manufacturing a hydrogel composite; (2) washing the manufactured hydrogel composite with a washing solvent; and (3) drying the washed hydrogel composite, wherein, impurities are removed from the hydrogel composite in Step (2), and the washing solvent is heated to a temperature equal to or higher than the boiling point (b.p.) of the washing solvent.

15 Claims, 3 Drawing Sheets

(56)                 References Cited

U.S. PATENT DOCUMENTS

| | | | |
|---|---|---|---|
| 2007/0259979 A1 | 11/2007 | Lee | |
| 2016/0096949 A1 | 4/2016 | Evans et al. | |
| 2016/0346751 A1* | 12/2016 | Chen | C01B 33/159 |
| 2018/0094114 A1 | 4/2018 | Evans et al. | |
| 2018/0112057 A1 | 4/2018 | Evans et al. | |
| 2018/0112058 A1 | 4/2018 | Evans et al. | |
| 2018/0134566 A1 | 5/2018 | Kim et al. | |
| 2018/0134867 A1 | 5/2018 | Evans et al. | |
| 2019/0062167 A1 | 2/2019 | Kim et al. | |
| 2019/0203014 A1 | 7/2019 | Evans et al. | |
| 2021/0155486 A1 | 5/2021 | Kang et al. | |
| 2022/0081532 A1 | 3/2022 | Evans et al. | |
| 2022/0289939 A1 | 9/2022 | Evans et al. | |
| 2023/0134383 A1 | 5/2023 | Evans et al. | |
| 2024/0026121 A1 | 1/2024 | Evans et al. | |

FOREIGN PATENT DOCUMENTS

| | | | |
|---|---|---|---|
| JP | 2018-111803 | 7/2018 | |
| JP | 2019-513665 | 5/2019 | |
| KR | 10-0133232 | 4/1998 | |
| KR | 10-0785521 | 12/2007 | |
| KR | 100785521 B1 * | 12/2007 | |
| KR | 10-2011-0125773 | 11/2011 | |
| KR | 20140076022 | 6/2014 | |
| KR | 10-2017-0104914 | 9/2017 | |
| KR | 10-1913507 | 10/2018 | |
| KR | 1913507 B1 * | 10/2018 | C01B 33/1585 |
| WO | 2014-126490 | 8/2014 | |
| WO | 2016054524 A2 | 4/2016 | |
| WO | 2019-017712 A1 | 1/2019 | |
| WO | 2019171543 | 9/2019 | |
| WO | 2020111763 A1 | 6/2020 | |

OTHER PUBLICATIONS

Machine translation of KR100785521B1 (Year: 2007).*

White et al. (Shortened aerogel fabrication times using an ethanol-water azeotrope as a gelation and drying solvent, Journal of Materials Chemistry A, 2015) (Year: 2015).*

* cited by examiner

METHOD OF MANUFACTURING SILICA AEROGEL

CROSS-REFERENCE TO RELATED APPLICATION

This application claims is a National Stage Application of International Application No. PCT/KR2021/009533 filed on Jul. 23, 2021, which priority to and the benefit of Korean Patent Application No. 10-2020-0092415, filed Jul. 24, 2020, the disclosure of which is incorporated herein by reference in its entirety.

TECHNICAL FIELD

The present invention relates to a method of manufacturing a silica aerogel, and more particularly, to a method of manufacturing a silica aerogel capable of effectively washing an aerogel during a process of manufacturing a silica aerogel.

BACKGROUND

Aerogels are highly porous materials that are composed of nanoparticles, and thus have been attracting attention for use as high-efficiency insulating materials, soundproof materials, and the like because they have high porosity and a high specific surface area and low thermal conductivity. Because such aerogels have very low mechanical strength due to their porous structure, aerogel composites, in which an aerogel is impregnated into fibrous blankets formed of existing insulating fibers (such as organic or inorganic fibers) so that the aerogel is bound to the fibrous blankets, have been developed.

As one example, a silica aerogel-containing blanket using a silica aerogel is manufactured through a silica sol preparation step, a gelation step, an aging step, a surface modification step, and a drying step. In particular, in the related art, a small amount of $NH_4OH$ is used, and hexamethyl disilazane (HMDS) is used as a surface modifying agent in the aging step. In this case, $NH_3$ is generated as HMDS is decomposed into trimethyl silanol (TMS) or trimethyl ethoxy silanol. $NH_4OH$ or $NH_3$ is reacted with carbon dioxide, which is used as an extraction solvent during supercritical drying, to form ammonium carbonate salts. Then, as the temperature decreases, the ammonium carbonate salts precipitate to form a solid-phase powder, which causes problems such as scale formation, pipe or valve clogging, or the like in subsequent processes. An additional removal process can be omitted by removing $NH_4OH$ and $NH_3$ remaining in the solvent in advance during a washing process before the supercritical drying process, and problems regarding the occurrence of ammonia smells can be solved.

A process of removing ammonia by washing is performed by diffusing ammonia from an aerogel into a washing bath. In this case, a method of increasing a temperature of the washing bath to increase a diffusion speed or reducing a concentration of ammonia in the washing bath to increase a difference in concentration of ammonia can be used. Ammonia in the washing bath is removed by a small amount of washing water using a method of increasing a usage amount of washing water to reduce a concentration of ammonia in the washing bath or discharging washing water in a gaseous phase to increase a content of ammonia in a discharging stream. However, because the temperature may not increase to a temperature equal to or higher than the boiling point of a washing solvent under atmospheric pressure using a conventional method, an increase in diffusion speed caused by an increase in temperature may be limited, and an increase in energy used to purify the solvent used for washing may be caused when a usage amount of washing water increases to reduce a concentration of ammonia in the washing bath.

When a washing process proceeds in a supercritical drying device, in order to prevent an increase in size of the device, the washing time cannot be increased to a certain level or more. Therefore, a more efficient washing method is required to achieve a desired level of ammonia removal rate.

PRIOR ART DOCUMENT

Patent Document

JP 2018-111803 A

BRIEF DESCRIPTION

Technical Problem

Therefore, it is an object of the present invention to provide a method of manufacturing a silica aerogel capable of effectively removing impurities from an aerogel by increasing a diffusion speed of a washing solvent from the aerogel to a washing bath during washing.

Technical Solution

To achieve the above object, according to one aspect of the present invention, provided is a method of manufacturing a silica aerogel, which includes: (1) manufacturing a hydrogel composite; (2) washing the manufactured hydrogel composite with a washing solvent; and (3) drying the washed hydrogel composite, wherein impurities are removed from the hydrogel composite in Step (2), and the washing solvent is heated to a temperature equal to or higher than the boiling point (b.p.) of the washing solvent.

Advantageous Effects

In the method of manufacturing a silica aerogel according to the present invention, a hydrogel composite can be washed with a washing solvent, which is heated to a temperature equal to or higher than the boiling point of the washing solvent at atmospheric pressure, to increase a diffusion speed of the washing solvent from the aerogel to a washing bath during washing, which makes it possible to effectively remove impurities from the hydrogel composite.

DETAILED DESCRIPTION

Figure 1:
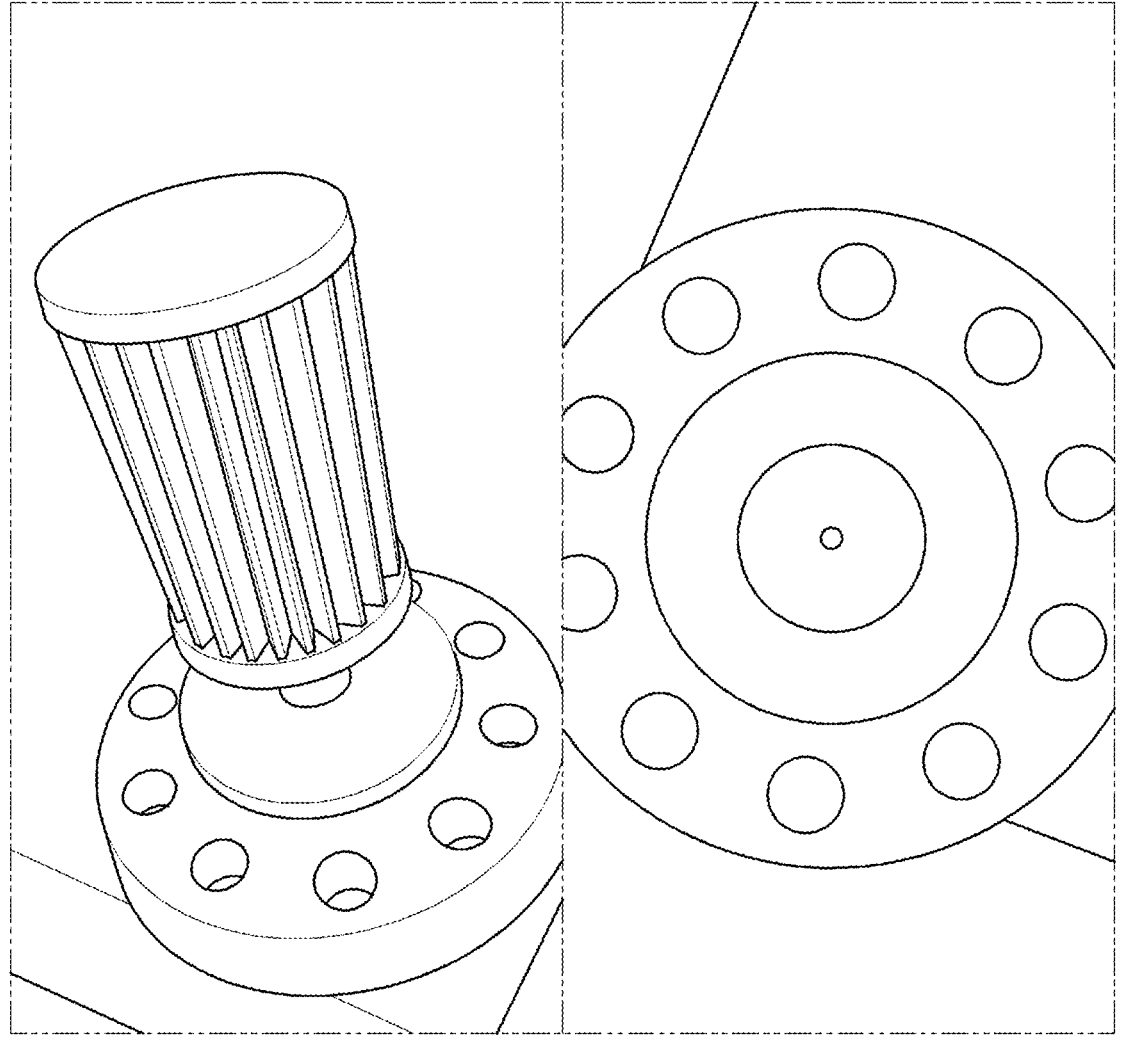
FIG. 1 is a photograph taken of a filter and a housing in a supercritical dryer used in Example 1.

Hereinafter, the present invention will be described in further detail in order to aid in understanding the present invention. In this case, the terms and words used in this specification and the appended claims are not intended to be construed as having common and dictionary meanings but are construed as having meanings and concepts corresponding to the technical spirit of the present invention in view of the principle that the present inventors can properly define the concepts of the terms and words in order to describe his/her invention in the best way.

A silica aerogel widely used as an insulating material in construction or industrial sites has a drawback in that the silica aerogel absorbs water in the air to gradually increase its thermal conductivity due to the hydrophilicity of a silanol group (Si—OH) when a surface of the silica aerogel is not hydrophobized. Also, the silica aerogel has a problem in that it is difficult to expect a spring back phenomenon because the collapse of pores is accelerated during a drying process, which makes it difficult to manufacture super-insulating products having micropores.

Therefore, it is necessary to hydrophobically modify a surface of the silica aerogel in order to suppress the absorption of moisture in the air to maintain low thermal conductivity. In general, the silica aerogel is manufactured through a silica sol preparation step, a gelation step, an aging step, a surface modification step, and a drying step.

In the silica sol gelation step, aging step, and both of these steps, a base catalyst can be used, and positive ions of the base catalyst used herein can react with carbon dioxide in the subsequent drying step to form a carbonate. Also, the surface modifying agent used in the surface modification step forms ammonium ions ($NH_4^+$) in a process of hydrophobizing a surface of the silica aerogel, and the formed ammonium ions can also react with carbon dioxide in the subsequent drying step to form an ammonium carbonate salt. The ammonium salt thus formed can clog a pipe in a drying system, and some of the ammonium salt can form a carbonate in the final silica aerogel.

For example, when ammonium hydroxide is used as the base catalyst, the remaining ammonium ions react with carbon dioxide together with the ammonium ions formed by decomposition of the surface modifying agent to form an ammonium carbonate salt. When the manufactured silica aerogel is dried by supercritical drying, the ammonium ions can react with carbon dioxide in the supercritical drying step to form an ammonium carbonate salt, which can clog a pipe in a supercritical drying system, and some of the ammonium carbonate salt can generate a hydrophilic ammonium carbonate salt in the final silica aerogel which increases thermal conductivity of the final silica aerogel, and can induce the adsorption of moisture, which results in increased thermal conductivity and insulation performance. Also, ammonia remaining in the supercritical waste liquid can generate bad smells during reuse of the solvent or wastewater treatment and can cause problems due to its high pH.

Therefore, it is, for example, necessary to remove residual impurities such as ammonia ($NH_3$) and ammonium ions ($NH_4^+$) in order to reduce the manufacturing costs of the silica aerogel and prevent insulation performance degradation of the final products. When the residual impurities is preferentially removed during a washing process before the supercritical drying process, a regeneration step of re-pyrolyzing the ammonium carbonate salt generated in the supercritical drying system can be omitted, and problems regarding the occurrence of an ammonia odor during the supercritical drying process can be solved.

The method of manufacturing a silica aerogel according to the present invention includes: (1) manufacturing a hydrogel composite; (2) washing the manufactured hydrogel composite with a washing solvent; and (3) drying the washed hydrogel composite, wherein impurities are removed from the hydrogel composite in Step (2), and the washing solvent is heated to a temperature equal to or higher than the boiling point (b.p.) of the washing solvent.

In the method of manufacturing a silica aerogel according to the present invention, the washing solvent used to wash the manufactured hydrogel composite can be heated to a temperature equal to or higher than the boiling point of the washing solvent, and can be added to the hydrogel composite so that the hydrogel composite can be washed with the washing solvent. As a result, ammonium ions ($NH_4^+$) can be more effectively removed from the hydrogel composite by increasing a diffusion speed of the washing solvent from the aerogel into a washing bath.

According to the present invention, the manufacturing of the hydrogel composite is not particularly limited, and can include a silica sol preparation step, an aging step, and a surface modification step. According to one embodiment of the present invention, the hydrogel composite can be an aged silica gel-fiber composite, but the present invention not particularly limited thereto.

The washing of the manufactured hydrogel composite with the washing solvent in Step (2) can be performed by disposing the manufactured hydrogel composite in a space for washing, for example, a washing bath, and introducing a washing solvent heated to a temperature equal to or higher than the boiling point of the washing solvent into the washing bath. According to one embodiment of the present invention, the washing step can also include: discharging the washing solvent from the washing bath after the washing solvent is introduced into the washing bath. In this way, the impurities can be removed from the hydrogel composite.

According to one embodiment of the present invention, heating the washing solvent to a temperature equal to or higher than the boiling point (b.p.) of the washing solvent means that the washing solvent is heated to a temperature equal to or higher than the boiling point (b.p.) of the washing solvent under a pressure at which a process of heating the washing solvent and a washing process are performed.

According to one embodiment of the present invention, the washing solvent heated to the temperature equal to or higher than the boiling point of the washing solvent can have a temperature of 80° C. to 200° C., specifically a temperature of 80° C. to 150° C., and more specifically a temperature of 80° C. to 120° C. Meanwhile, energy required to heat the washing solvent can be calculated by theoretically determining the energy required to heat a liquid-phase washing solvent and the energy required to convert the washing solvent into a gaseous phase, followed by adding up the two uses of energy. The energy required to heat the washing solvent thus calculated can be in a range of 1 $MJ/m^2/hr$ to 50 $MJ/m^2/hr$, specifically in a range of 2 $MJ/m^2/hr$ to 30 $MJ/m^2/hr$, and more specifically in a range of 10 $MJ/m^2/hr$ to 30 $MJ/m^2/hr$.

When the washing solvent is heated to the above temperature range, some or all of the washing solvent can be vaporized. Therefore, the washing solvent added to the hydrogel composite can include the heated and vaporized washing solvent. When the temperature of the washing solvent is too low, the washing solvent is not vaporized to an appropriate extent. On the other hand, when the temperature of the washing solvent is too high, an excessively large amount of energy can be consumed to heat the washing solvent. Therefore, when the temperature of the washing solvent satisfies the temperature range, the silica hydrogel can be more effectively washed, and the consumption of energy can be maintained at an appropriate level.

According to one embodiment of the present invention, after the washing of the hydrogel composite is performed, the discharged waste washing solvent can have a temperature of 30° C. to 120° C., specifically a temperature of 50 to 115° C., and more specifically a temperature of 70 to 110° C. When the temperature of the discharged waste washing solvent is too low, the diffusion of the washing solvent does not reach an appropriate level during the washing process, which results in poor removal efficiency of ammonium ions. On the other hand, when the temperature of the discharged waste washing solvent is too high, the hydrogel composite can be exposed to a high temperature during the washing process to cause a change in physical properties of the aerogel, and an excessive amount of energy can be consumed to wash the hydrogel composite.

According to one embodiment of the present invention, the washing solvent added to the hydrogel composite can be added to the hydrogel composite in a heated and vaporized gaseous phase, but the washing solvent added to the hydrogel composite can be in a mixed phase of a gaseous phase and a liquid phase, depending on the heating temperature condition. When the washing solvent is in a mixed phase of a gaseous phase and a liquid phase, a content of the washing solvent included in the gaseous phase can be in a range of 10 to 90% by weight, specifically in a range of 10% by weight to 70% by weight, and more specifically in a range of 20% by weight to 50% by weight, based on the total weight of the washing solvent.

The washing solvent can include ethanol. Specifically, the washing solvent can be ethanol or a mixture including ethanol and water. When the washing solvent is a mixture including ethanol and water, the washing solvent can be aqueous ethanol including 85% by volume to 99% by volume of ethanol. The percentage by volume is measured when the washing solvent is in a liquid phase, and is a content based on a liquid phase.

The ethanol can be preferably used as the washing solvent because the ethanol has excellent solubility in $CO_2$ used as a supercritical solvent in a subsequent supercritical drying process. The ethanol can have excellent solubility in $CO_2$ and can exhibit superior drying efficiency during supercritical drying, compared to other alcohol-based solvents having a higher number of carbon atoms. Also, the ammonium ions included in the hydrogel composite are present in a relatively large amount because the ammonium ions are ionized in water. Therefore, when ethanol exhibiting high solubility in water included in the hydrogel composite is used as the washing solvent, the ammonium ions can be more effectively removed from the hydrogel composite. In addition, since the ethanol has a lower surface tension than other alcohol-based solvents having a higher number of carbon atoms, adverse effects during drying, such as shrinkage applied to the hydrogel composite during the supercritical drying of the hydrogel composite after the washing step, and the like, can be minimized.

According to one embodiment of the present invention, when the mixture including ethanol and water is used as the washing solvent, the washing solvent can be a mixture including ethanol and water in a gaseous phase and ethanol and water in a liquid phase together, a mixture including ethanol in a gaseous phase and water in a liquid phase, or a mixture including ethanol and water in a gaseous phase, depending on the heating temperature range of the washing solvent.

According to one embodiment of the present invention, the washing of Step (2) can be performed at atmospheric pressure. When the washing is performed, the washing solvent can be heated to a temperature equal to or higher than the boiling point of the washing solvent at atmospheric pressure.

According to one embodiment of the present invention, the impurities can include one or more selected from the group consisting of residues derived from the base catalyst used during the manufacturing of the hydrogel composite, residues derived from the surface modifying agent, and silica fine particles.

The base catalyst can be a catalyst used during gelation of a silica gel, a catalyst used during aging of the silica gel, or a base catalyst used during the gelation and aging of the silica gel.

The base catalyst can include one or more selected from the group consisting of sodium hydroxide, potassium hydroxide, ammonium hydroxide ($NH_4OH$), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino)ethanol, 2-(methylamino)ethanol, N-methyl diethanolamine, dimethylaminoethanol, diethylaminoethanol, nitrilotriethanol, 2-(2-aminoethoxy)ethanol, 1-amino-2-propanol, triethanolamine, monopropanolamine, and dibutanolamine. Specifically, the base catalyst can be ammonium hydroxide ($NH_4OH$).

Also, the surface modifying agent can include a silazane-based compound. Specifically, the silazane-based compound can be hexamethyldisilazane. The silazane-based compound can react with an alcohol to form two molecules, that is, an alkoxysilane compound and ammonia, and the formed ammonia can remain as an impurity.

According to one embodiment of the present invention, the residues derived from the base catalyst and the residues derived from the surface modifying agent can include ammonia ($NH_3$), ammonium ions ($NH_4^+$), and a mixture thereof.

Meanwhile, the silica fine particles can be an impurity generated during the manufacturing of the hydrogel composite, that is, silica aerogel particles detached from the hydrogel composite through the removal in Step (2). In the method of manufacturing a silica aerogel according to the present invention, the hydrogel composite is washed using the washing solvent heated to a temperature equal to or higher than the boiling point of the washing solvent, and the washing solvent is in a gaseous phase vaporized by heating or in a mixed phase including a gaseous phase and a liquid phase. Therefore, the silica fine particles weakly attached to the hydrogel composite and included as an impurity can be effectively removed from the hydrogel composite using the washing solvent included in a gaseous phase.

According to one embodiment of the present invention, a flow rate of the washing solvent can be in a range of 10 mL/m²/min to 800 mL/m²/min, specifically in a range of 30 mL/m²/min to 750 mL/m²/min, and more specifically in a range of 40 mL/m²/min to 700 mL/m²/min. When the flow rate of the washing solvent satisfies the above range, the impurities can be effectively removed from the hydrogel composite. In particular, the silica fine particles included as an impurity in the hydrogel composite can be effectively removed from the hydrogel composite. When the flow rate of the washing solvent is too small, washing efficiency using the washing solvent can be poor. On the other hand, when the flow rate of the washing solvent is too large, an excessive amount of energy can be consumed and an unnecessary waste of solvent can be exacerbated.

Also, a usage amount of the washing solvent can be adjusted according to the amount of the hydrogel composite to be washed. Specifically, a volume flow ratio of the hydrogel composite and the washing solvent in Step (2) can be in a range of 1:1 to 1:9, specifically in a range of 1:1 to 1:8.5, and more specifically in a range of 1:1 to 1:8.3. The volume flow ratio represents a ratio of a volume per hour (L/h) of the washing solvent added to a washing bath with respect to a volume (L) of the hydrogel composite disposed in a space in which the hydrogel composite is washed, for example, a washing bath.

The washing of the hydrogel composite with the washing solvent in Step (2) can be performed for 30 minutes to 200 minutes, specifically 60 minutes to 200 minutes. In the method of manufacturing a silica aerogel according to the present invention, the washing solvent heated to a temperature equal to or higher than the boiling point (b.p.) of the washing solvent at atmospheric pressure is added to the hydrogel composite, and thus the hydrogel is washed with the washing solvent by increasing a diffusion speed of the washing solvent. Therefore, the method of manufacturing a silica aerogel according to the present invention can have superior ammonium ion removal efficiency even when the washing is performed for a relatively short washing time compared to conventional methods in which the washing is performed using the washing solvent heated to a temperature lower than the boiling point of the washing solvent.

The drying of the hydrogel composite in Step (3) can be performed by supercritical drying, ambient drying, or a combination of both. When the drying is performed by both the supercritical drying and the ambient drying, the supercritical drying can be first performed, and the ambient drying can be then further performed.

The supercritical drying can be performed using supercritical carbon dioxide. The supercritical carbon dioxide refers to carbon dioxide that is in a critical state in which a gas and a liquid are not distinguished from each other because an evaporation process does not proceed when the temperature and pressure exceed a predetermined temperature and pressure limit called a supercritical point.

The supercritical carbon dioxide has a molecular density close to a liquid, but has a low viscosity, the nature of which is close to a gas, and exhibits high drying efficiency because the supercritical carbon dioxide is rapidly diffused and has high thermal conductivity, thereby making it possible to shorten a drying time. Specifically, the supercritical drying can be performed by putting a hydrogel composite into a supercritical drying reactor, filling the supercritical drying reactor with liquid-phase $CO_2$ to replace a solvent in the hydrogel composite with $CO_2$, heating the resulting mixture to 40 to 50° C. at a certain heating rate, specifically a rate of 0.1° C./min to 1° C./min, and maintaining a pressure higher than a pressure at which carbon dioxide becomes a supercritical state, specifically a pressure of 100 bar to 150 bar so that the pressure maintains the supercritical state of carbon dioxide for a certain time, specifically 20 minutes to 1 hour. In general, carbon dioxide becomes a supercritical state at a temperature of 31° C. and a pressure of 73.8 bar. In this case, the supercritical drying can be performed by maintaining carbon dioxide at a certain temperature and pressure, at which carbon dioxide becomes a supercritical state, for 2 hours to 12 hours, specifically 2 hours to 6 hours, and gradually lowering the pressure.

The ambient drying can be performed using a conventional method such as natural drying, and the like under the conditions of a temperature of 70 to 200° C. and atmospheric pressure (1±0.3 atm).

According to one embodiment of the present invention, after the hydrogel composite is washed in Step (2), the method of manufacturing a silica aerogel can also further include: recovering the waste washing solvent to purify the recovered waste washing solvent.

The purifying of the waste washing solvent recovered in Step (2) can include: introducing the recovered waste washing solvent into a purification column, and reusing the purified washing solvent as the washing solvent in Step (2).

The purification process which has been performed in the purification column can be performed at atmospheric pressure. The recovered waste washing solvent can be put into the purification column in a state in which the recovered waste washing solvent is cooled by passing through a heat exchanger. Accordingly, a process of cooling the recovered waste washing solvent through the heat exchanger to reduce a temperature of the recovered waste washing solvent can be further performed before the recovered waste washing solvent is transferred to the purification column. Specifically, a process of cooling the recovered waste washing solvent to a temperature equal to or lower than the boiling point of the washing solvent, more specifically, cooling the recovered waste washing solvent to the boiling point of the washing solvent, can be performed.

EXAMPLES

Hereinafter, exemplary embodiments of the present invention will be described in detail so that a person having ordinary skill in the art to which the present invention belongs can easily put the invention into practice. However, it should be understood that the present invention can be embodied in various forms and is not intended to limit the exemplary embodiments described herein.

Example 1

Hydrated tetraethyl orthosilicate (TEOS) as a silica precursor, ethanol, and distilled water were mixed at a weight ratio of 1:0.9:0.22 to prepare a silica sol. Separately, ethanol, $NH_4OH$ (a 30% aqueous solution), and trimethylethoxysilane (TMES) were mixed at a weight ratio of 1:0.054:0.154 to prepare a gelling catalyst solution. The silica sol and the gelling catalyst solution thus prepared were mixed at a volume ratio of 1:1 to prepare a catalyzed sol.

A glass fiber mat was immersed in the catalyzed sol, and then gelled for 10 minutes. After the gelation was completed, the gelled hydrogel blanket was aged at 70° C. for 24 hours in a chamber.

The aged hydrogel blanket was washed for 200 minutes by continuously injecting aqueous EtOH (91.8% (v/v)) heated to 90° C. into the aged hydrogel blanket and discharging the aqueous EtOH from the aged hydrogel blanket at a flow rate of 50 mL/m²/min.

When the washing was completed, the hydrogel blanket was put into a supercritical extractor, and then subjected to supercritical drying by injecting $CO_2$ at 75° C. and 150 bar into the supercritical extractor. Then, a silica aerogel dried by the supercritical drying was collected.

Examples 2 to 6

Silica aerogels were manufactured by performing washing and supercritical drying in the same manner as in Example 1, except that the temperature, flow rate, and washing time of the washing solvent were changed as listed in Table 1 below.

Comparative Example 1

A silica aerogel was manufactured in the same manner as in Example 1, except that the washing process was not performed.

Comparative Example 2

A silica aerogel was manufactured in the same manner as in Example 1, except that the aged hydrogel blanket was washed for 360 minutes by continuously injecting the aqueous EtOH (91.8% (v/v)) heated to 70° C. into the aged hydrogel blanket and discharging the aqueous EtOH from the aged hydrogel blanket at a flow rate of 50 mL/m²/min.

Comparative Example 3

A silica aerogel was manufactured in the same manner as in Example 1, except that the aged hydrogel blanket was washed for 240 minutes by continuously injecting the aqueous EtOH (91.8% (v/v)) heated to 70° C. into the aged hydrogel blanket and discharging the aqueous EtOH from the aged hydrogel blanket at a flow rate of 670 mL/m²/min.

Experimental Example

1) Ammonia Removal Rate

An ammonia removal rate of each of the silica aerogels of Examples 1 to 6 and Comparative Examples 1 to 3 was calculated according to the following Mathematical Expression 1 after an initial amount of ammonia included in the silica gel-fiber composite and an amount of ammonia remaining after the washing were determined.

Initial amount of ammonia in silica gel-fiber composite–Amount of ammonia remaining after washing)/Initial amount of ammonia in silica gel-fiber composite×100    <Mathematical Expression 1>

2) Heating Duty

The duty (amount of heat) required to heat the washing solvent in the washing process shown in Examples 1 to 6 and

3) Moisture Impregnation Rate

Each of the silica aerogels manufactured in Examples 1 to 6 and Comparative Examples 1 to 3 was used to prepare three specimens (125 mm×125 mm with a thickness of less than 10 mm), and weights ($W_1$) of the specimens were measured.

The specimens were allowed to float on 21±2° C. distilled water and sink to 127 mm under the water by putting a 6.4-mm mesh screen on each of the specimens.

After 15 minutes, the screen was removed, the specimens were picked up with a clamp when the specimens rose to the surface of the water, and hung vertically for 60±5 seconds. Then, the weights ($W_2$) of the specimens were measured.

A moisture impregnation rate was calculated using the following Mathematical Expression 2.

$$\text{Moisture impregnation rate} = (W_2 - W_1)/W_1 \times 100 \qquad \text{<Mathematical Expression 2>}$$

wherein $W_1$ represents a weight of a specimen before being immersed in water, and $W_2$ represents a weight of the specimen after being immersed in water.

4) Dust Emission Rate

A dust emission rate of each of the manufactured specimens as described in the moisture impregnation rate was calculated using Mathematical Expression 3 after constant vibrations were applied to the specimens under the following conditions.

Specimen: 125 mm×125 mm with thickness of less than 10 mm

Vibrations: 24 Hz

Amplitude: 3 mm

Time: 12 hours $$\text{Dust emission rate } (P_v) \text{ using vibrations} = (W_c - W_v)/W_c \times 100 \qquad \text{<Mathematical Expression 3>}$$

wherein $W_c$ represents a weight of a specimen before vibrations, and $W_v$ represents a weight of the specimen after vibrations.

5) Measurement of Thermal Conductivity

The thermal conductivity of each of the silica aerogel blanket rolls manufactured in Examples 1 to 6 and Comparative Examples 1 to 3 was measured at room temperature (25° C.) using HEM 436 equipment commercially available from NETZSCH.

TABLE 1

| | Temperature (° C.) | Heating duty (MJ/m²/hr) | Washing solvent flow rate (ml/m²/min) | Washing time (min) | Ammonia removal rate (%) | Dust emission rate (%) | Moisture impregnation rate (%) | Thermal conductivity (mw/mk) |
|---|---|---|---|---|---|---|---|---|
| Example 1 | 90 | 2.8 | 50 | 200 | 62.3 | 0.6 | 3.9 | 17.1 |
| Example 2 | 90 | 5.0 | 334 | 200 | 63.9 | 0.4 | 3.1 | 16.9 |
| Example 3 | 110 | 17.3 | 250 | 120 | 68.3 | 0.5 | 2.8 | 17.3 |
| Example 4 | 110 | 18.1 | 334 | 120 | 72.7 | 0.4 | 2.7 | 16.8 |
| Example 5 | 150 | 22.8 | 500 | 150 | 68.0 | 0.3 | 2.4 | 16.7 |
| Example 6 | 150 | 24.6 | 670 | 60 | 79.9 | 0.2 | 2.0 | 16.4 |
| Comparative Example 1 | — | — | — | — | — | 4.3 | 6.8 | 17.5 |
| Comparative Example 2 | 70 | 0.4 | 50 | 360 | 45.4 | 1.2 | 4.1 | 16.9 |
| Comparative Example 3 | 70 | 4.7 | 670 | 240 | 53.1 | 1.5 | 3.5 | 17.3 |

Comparative Examples 1 to 3 was calculated by adding the energy required to heat a liquid-phase washing solvent and the energy required to convert the washing solvent into a gaseous phase.

The silica aerogel blankets of Examples 1 to 6 had a remarkably excellent ammonia removal rate even when the silica aerogel blankets were washed for a short washing time, compared to that of Comparative Example 1 in which separate washing was not performed, and those of Comparative Example 2 and 3 in which a washing solvent having a temperature of 70° C. was used. The silica fine particles included in the silica aerogel blanket in a state in which the silica fine particles were weakly bound to the silica aerogel blanket can be scattered during working using the silica aerogel blanket and scattered by impact and vibration on products to which the silica aerogel blanket was applied. A degree of dust emission of the silica aerogel blanket can be evaluated using a method of measuring a decrease in weight of the silica aerogel blanket after vibrations are applied to the silica aerogel blanket. As shown in Table 1, it can be seen that the silica aerogel blankets of Examples 1 to 6 had a small amount of the silica fine particles detached after the vibrations and a low degree of dust emission caused by the vibrations because a decrease in weights of the silica aerogel blankets of Examples 1 to 6 was remarkably smaller than a decrease in weights of the silica aerogels of Comparative Examples 1 to 3. The silica aerogel of Comparative Example 1 in which separate washing was not performed had the highest dust emission rate, and the silica aerogels of Comparative Examples 2 and 3 had a dust emission rate lower than the silica aerogel of Comparative Example 1, but had a dust emission rate significantly higher than the silica aerogels of Examples 1 to 6.

It can be seen from the evaluation of the dust emission rate that the silica fine particles weakly bound to the aerogel blanket were removed during the washing process, and the silica fine particles were more effectively removed during the washing process of the present invention. Therefore, it can be seen that silica aerogels having a small dust emission rate, such as the silica aerogels of Examples 1 to 6, were manufactured using the method of manufacturing a silica aerogel according to the present invention.

Figure 2:
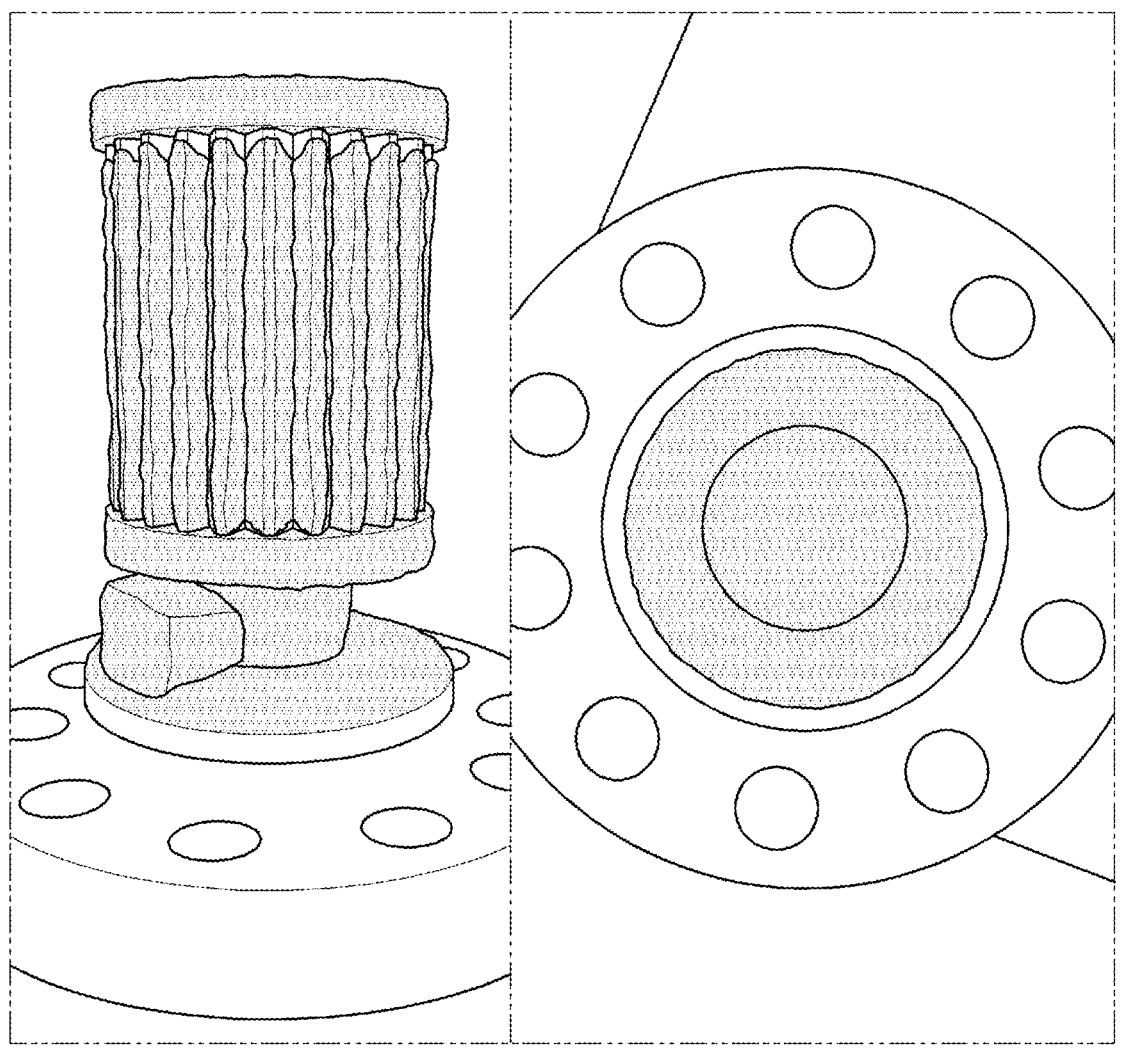
FIG. 2 is a photograph taken of a filter and a housing in a supercritical dryer used in Comparative Example 1.
Figure 3:
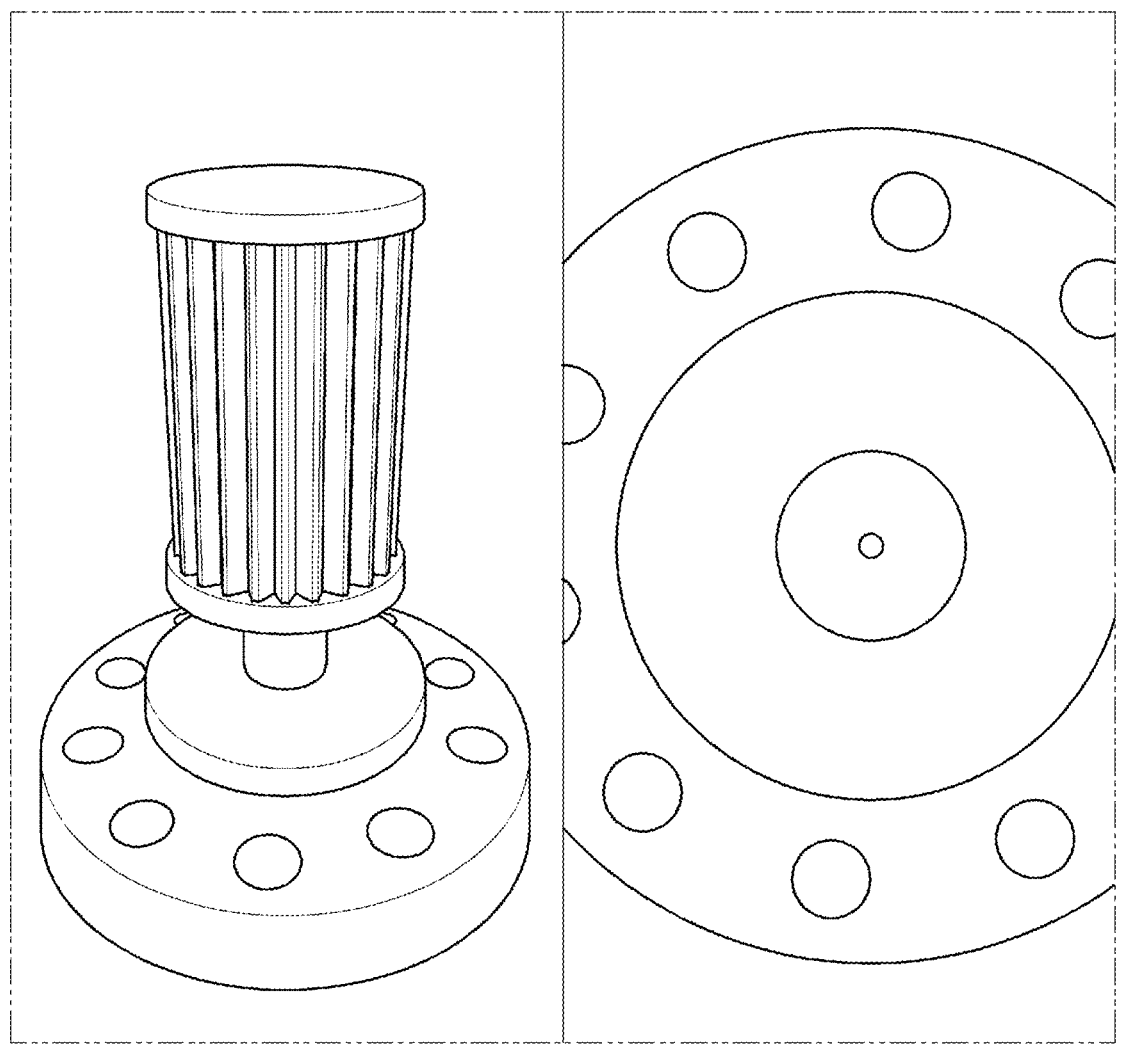
FIG. 3 is a photograph taken of a filter and a housing in a supercritical dryer used in Comparative Example 3.

FIGS. 1 to 3 show photographs taken of filters and housings in supercritical dryers used in Example 1 and Comparative Examples 1 and 3, respectively. Referring to FIGS. 1 to 3, it can be seen that a large amount of ammonium salt generated during the supercritical drying process was deposited in the filter and the housing in the case of Comparative Example 1 in which separate washing was not performed. In contrast, it can be seen that a very small amount of the ammonium salt was deposited in the filter and the housing in the case of Example 1 and Comparative Example 3 in which ammonium ions were removed. In particular, it can be seen that the silica aerogel of Example 1 had superior results compared to that of Comparative Example 3 because the ammonium salt deposited in the housing was not observed in the case of Example 1.

Further, it can be seen that the silica aerogels of Examples 1 to 6 had a lower moisture impregnation rate, compared to the silica aerogels of Comparative Examples 1 and 2. A process of manufacturing a silica aerogel necessarily requires a step of hydrophobically modifying a surface of the silica aerogel in order to suppress the moisture absorption of the silica aerogel to maintain low thermal conductivity. However, even when the surface of the silica aerogel was hydrophobically modified to impart hydrophobicity to the silica aerogel, when hydrophilic materials such as impurities (such as salts and the like) were included in the silica aerogel, the moisture impregnation rate increased proportionally to the amount of the hydrophilic materials. The moisture impregnation rate is one of the physical properties that can reflect the durability when the silica aerogel is used as the insulating material in the event of rain or under water. When the moisture impregnation rate is high, the silica aerogel is easily impregnated with water, which results in degraded thermal conductivity over time. Accordingly, when the moisture impregnation rate is high, even though the silica aerogel has low thermal conductivity immediately after the manufacture of the silica aerogel, thermal conductivity increases over time. As such, based on the fact that silica aerogels of Examples 1 to 6 had a low moisture impregnation rate, it can be seen that the silica aerogels manufactured by the method of manufacturing a silica aerogel according to the present invention had high durability.

The invention claimed is:

1. A method of manufacturing a silica aerogel, comprising:
   (1) manufacturing a hydrogel composite;
   (2) washing the manufactured hydrogel composite with a washing solvent; and
   (3) drying the washed hydrogel composite,
   wherein impurities are removed from the hydrogel composite in Step (2), and
   the washing solvent is heated to a temperature higher than the boiling point (b.p.) of the washing solvent,
   wherein the washing solvent after being heated has a temperature of 110° C. to 200° C., and
   wherein the washing solvent is a mixture comprising ethanol and water.

2. The method of claim 1, wherein the washing solvent is a mixed phase of a gaseous phase and a liquid phase.

3. The method of claim 1, wherein the washing solvent comprises 85% by volume to 99% by volume of ethanol.

4. The method of claim 1, wherein the washing solvent after being heated has a temperature of 80° C. to 120° C.

5. The method of claim 1, wherein the impurities comprise one or more selected from the group consisting of residues derived from a base catalyst used during the manufacturing of the hydrogel composite, residues derived from a surface modifying agent, and silica fine particles.

6. The method of claim 5, wherein the base catalyst comprises one or more selected from the group consisting of sodium hydroxide, potassium hydroxide, ammonium hydroxide (NH$_4$OH), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methylamino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, and dibutanolamine.

7. The method of claim 5, wherein the surface modifying agent comprises a silazane-based compound.

8. The method of claim 5, wherein the silica fine particles are silica aerogel particles detached from the hydrogel composite during the washing in Step (2) as an impurity generated during the manufacturing of the hydrogel composite.

9. The method of claim 5, wherein the residues derived from the base catalyst and the residues derived from surface modifying agent comprise ammonia (NH$_3$), ammonium ions (NH$_4^+$), and a mixture thereof.

10. The method of claim 1, wherein a flow rate of the washing solvent is in a range of 10 mL/m$^2$/min to 800 mL/m$^2$/min.

11. The method of claim 1, wherein a volume flow ratio of the hydrogel composite and the washing solvent in Step (2) is in a range of 1:1 to 1:9.

12. The method of claim 1, wherein Step (2) is performed for 30 minutes to 200 minutes.

13. The method of claim 1, wherein Step (3) is performed by supercritical drying, ambient drying, or a combination of both.

14. The method of claim 1, further comprising:

recovering the waste washing solvent in Step (2) to form a recovered waste washing solution; and purifying the recovered waste washing solution.

15. The method of claim 14, wherein the purifying of the recovered waste washing solvent comprises:

introducing the recovered waste washing solvent into a purification column to purify the waste washing solvent to yield a purified washing solution; and reusing the purified washing solvent as the washing solvent in Step (2).

* * * * *